Jan. 8, 1929.　　　　　　　　　　　　　　　　1,698,261
H. DE SMITH ET AL
TUBE CUTTING MACHINE
Filed June 24, 1927　　　4 Sheets-Sheet 1
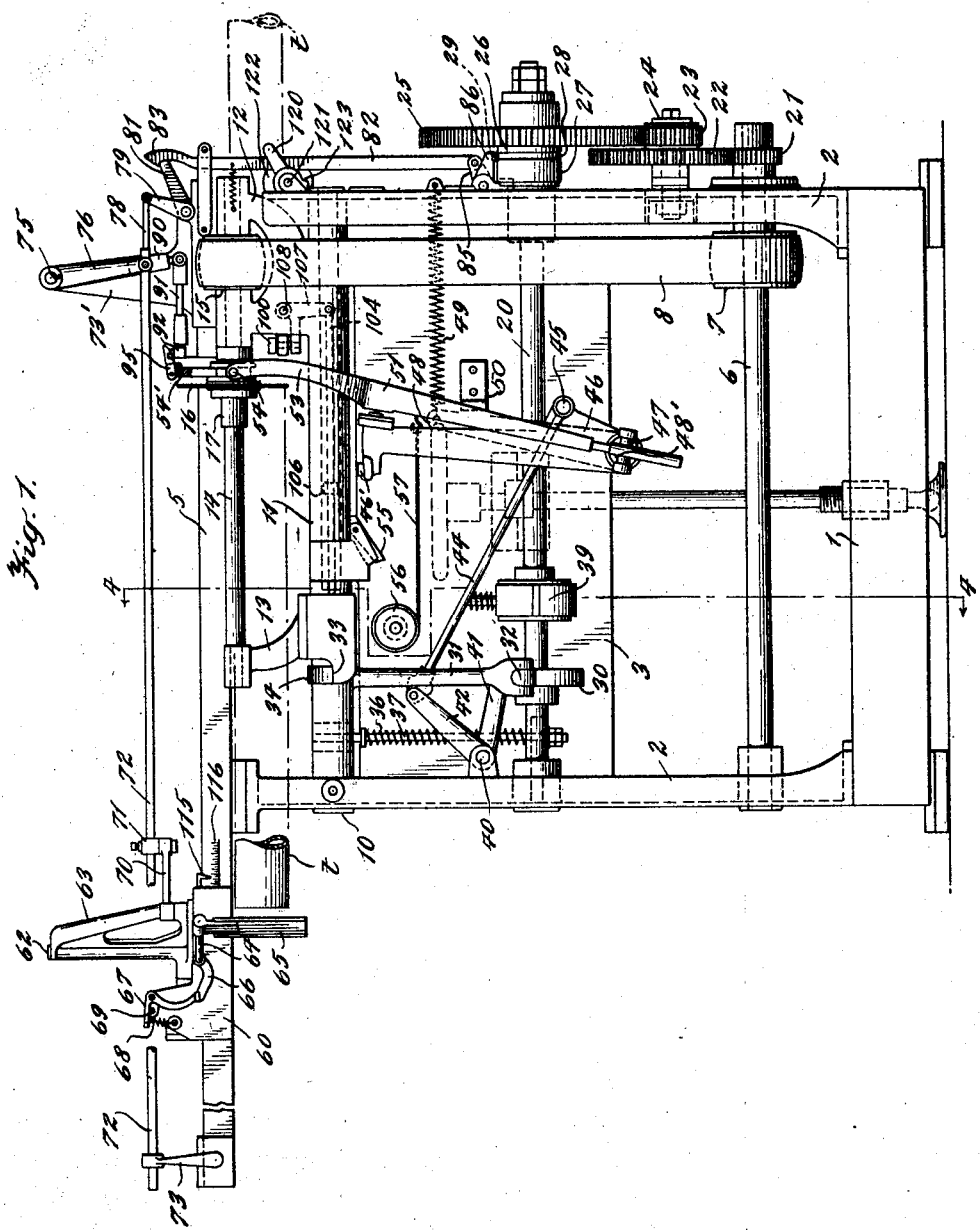

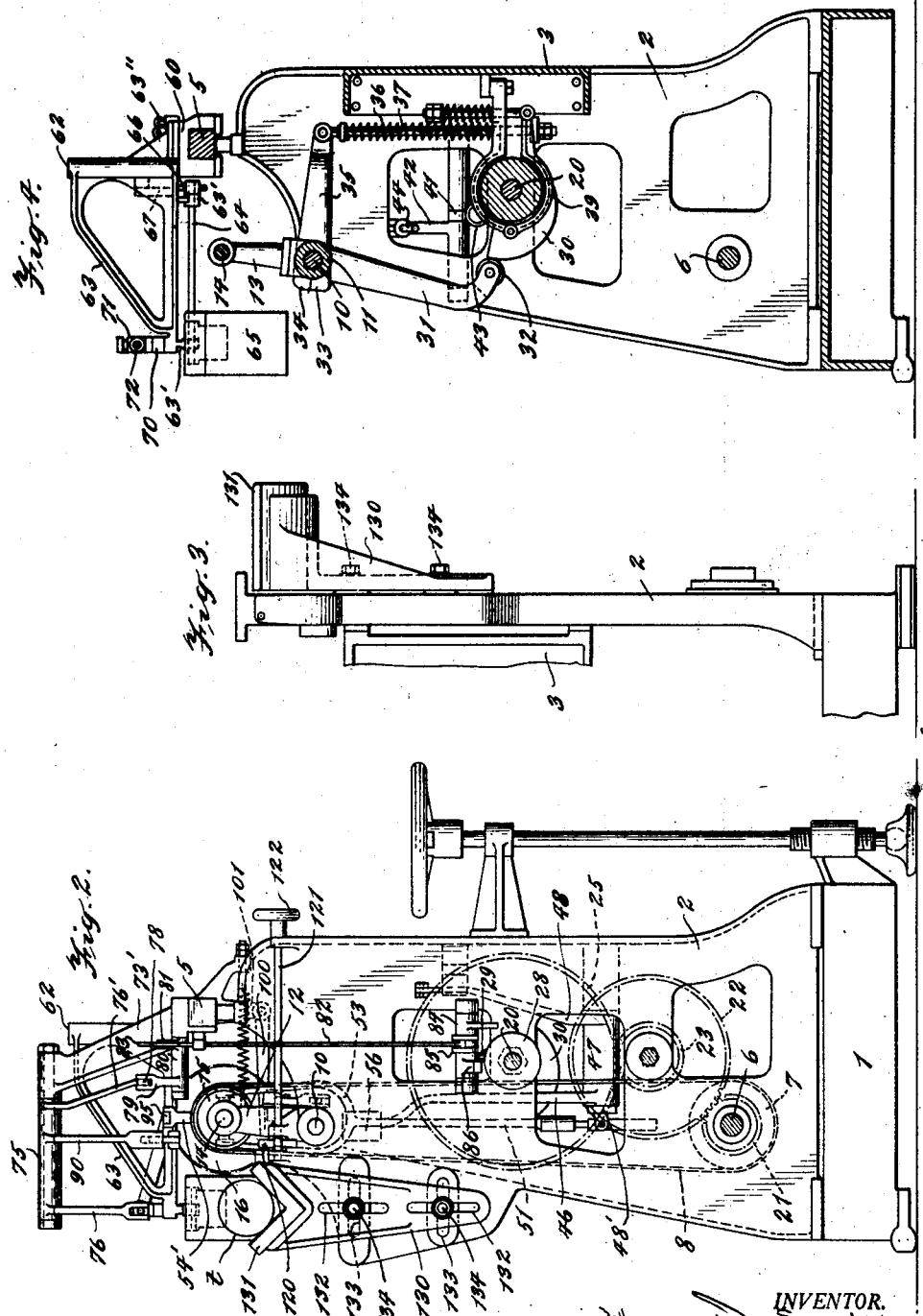

Jan. 8, 1929.
H. DE SMITH ET AL
1,698,261
TUBE CUTTING MACHINE
Filed June 24, 1927
4 Sheets-Sheet 3
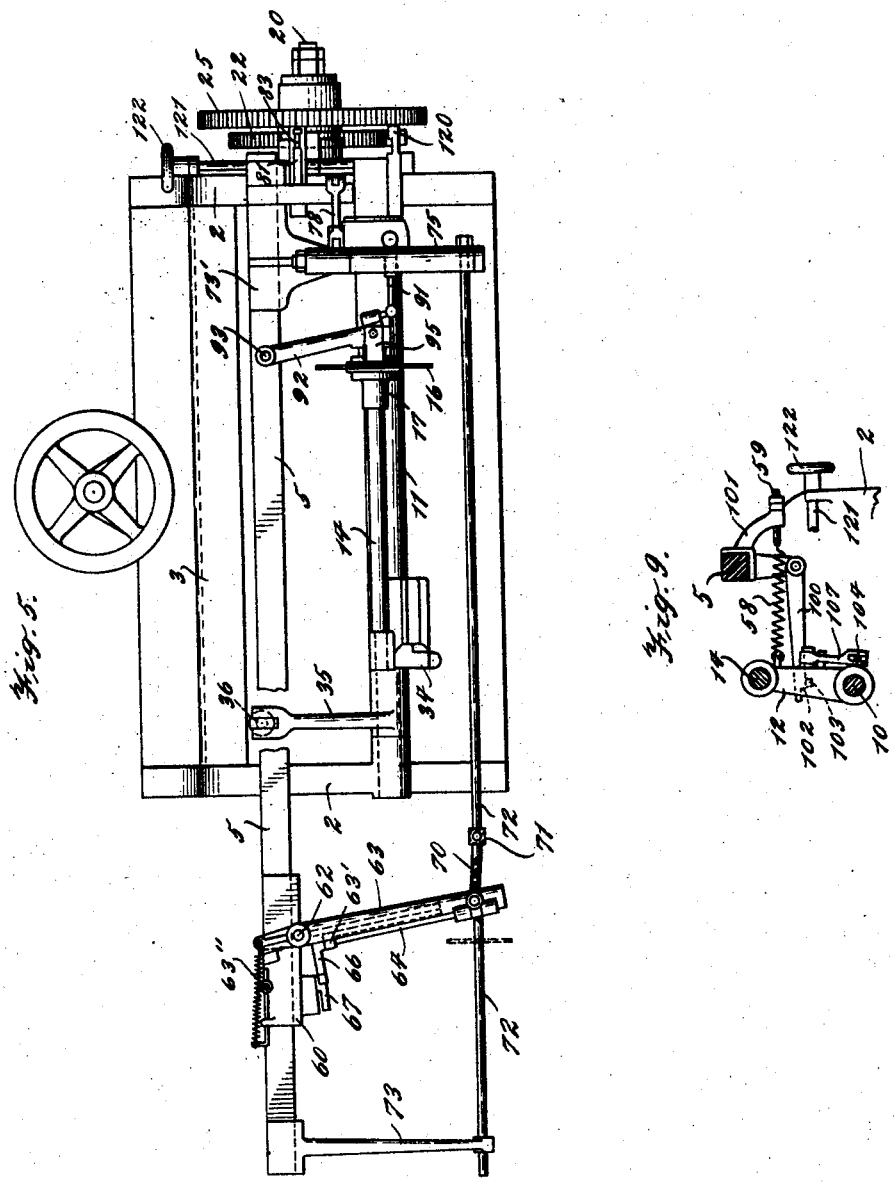
INVENTOR.
BY
ATTORNEYS.

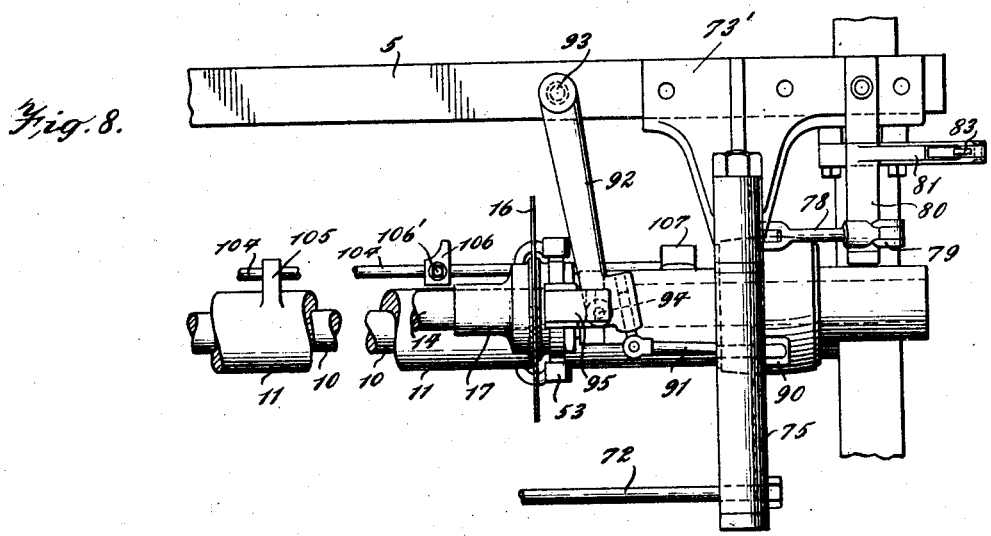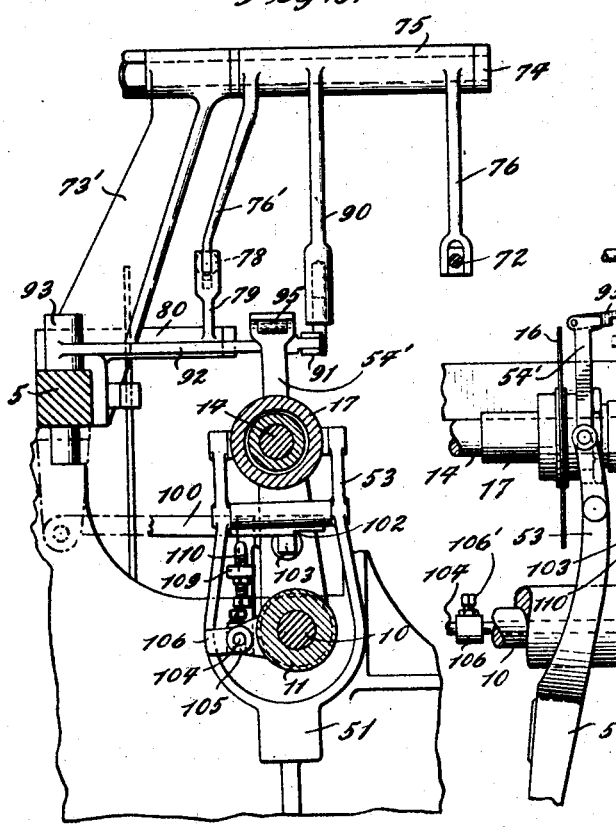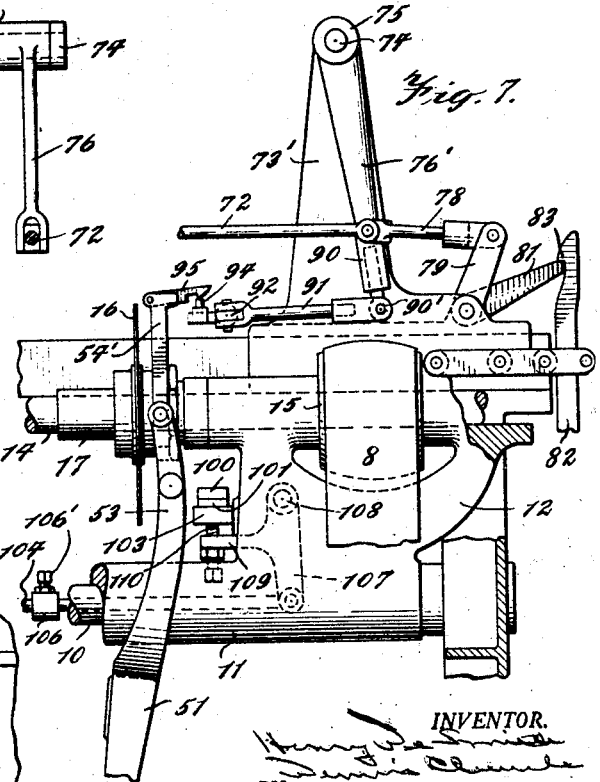

Patented Jan. 8, 1929.

1,698,261

UNITED STATES PATENT OFFICE.

HENRY DE SMITH AND DENNIS CHURCH, OF ROCHESTER, NEW YORK, ASSIGNORS TO M. D. KNOWLTON COMPANY, OF ROCHESTER, NEW YORK, A CORPORATION OF NEW YORK.

TUBE-CUTTING MACHINE.

Application filed June 24, 1927. Serial No. 201,189.

The invention relates to machines for cutting tubing, formed of paper or like material, into lengths, more especially to machines of the general type shown in the patent to Seymour No. 1,626,878, dated May 3, 1927, and has for its object to provide such machines with means for accurately determining and effecting the cutting of sections of uniform length from tubing fed continuously to the machine. The invention also provides improved means for releasing the saw carrying frame from cutting relation as well as a simplified lockout device to prevent the saw frame being moved to project the saw into the path of movement of the tubing, and thereby suspend the cutting operation.

The invention is illustrated in the accompanying drawings, in which:—

Fig. 1 is a side elevation of the machine.
Fig. 2 is an end elevation thereof.
Fig. 3 is a fragmentary side elevation illustrating the support for the tubing.
Fig. 4 is a sectional elevation on line 4—4 of Fig. 1.
Fig. 5 is a plan view with certain of the parts omitted to avoid confusion.
Fig. 6 is a partial sectional end elevation on an enlarged scale.
Fig. 7 is a side elevation of the parts shown in Fig. 6.
Fig. 8 is a plan view of the same.
Fig. 9 is a fragmentary cross sectional detail of the saw frame with the latching and retracting means therefor.

The operation of tube cutting machines of the general type disclosed in the patent aforesaid involves a constant speed of the saw and a constant time interval between the movement of the target or trip plate by the advance end of the tubing and the engagement of the saw with the tubing $t$, whereas the rate of delivery of the tubing to the machine, especially if such delivery is from a tube forming or winding machine, varies widely, due to temperature and weather conditions, slippage of the winding belt, the character of paper and adhesive employed, and the size of the tubing. As the result of this variance in the rate of the feed of the tubing through the machine, it is practically impossible to cut sections of regular and uniform lengths unless special means are provided to compensate for the variations in the rate of travel of the tubing through the machine during the cutting operation, and it is the primary purpose of the instant invention to effect this compensation by the provision of means for automatically locking the saw to the trip mechanism during the initial movement of the latter to effect the projection of the saw into engagement with the tubing, and to release said locking means when such engagement has been effected, so that, for a given setting of the machine, sections of accurately uniform lengths will be cut from the tubing.

As hereinbefore stated, the machine of the present invention is generally like that disclosed in the Seymour patent aforesaid and may be associated with a tube forming machine to receive the tubing delivered therefrom and cut the same into predetermined lengths or, if desired, it may be employed as a separate entity to which lengths of tubing may be fed by any other means.

The machine involves a base 1 upon which are mounted side frame 2, 2 connected by a cross girder 3, and secured to the top of the side frame is a longitudinal bar 5, preferably square in cross section, upon which the trip mechanism and certain accessories are mounted.

Journaled in the side frames, above the base, is a drive shaft 6 which may be driven by a suitable motor, not shown, said shaft carrying a belt pulley 7 operating a belt 8. On the outboard end of the shaft 6 is fixed a driving gear 21 connected by reducing gears 22 and 23, journaled on the stub shaft 24 fast to the side frame 2, with a large gear 25 loosely mounted on shaft 20, which latter is journaled in the side frames 2. The gear 25 is adapted to be connected with the shaft 20 to drive the latter by means of a ball clutch of standard type, which is conventionally illustrated in Fig. 1, one of the clutch members 26 formed in the hub of the gear 25, the mating clutch member 27 keyed to the shaft 20, with the ball shifting plate 28, interposed between the elements 26 and 27, being provided with a radial lug 29 on its periphery, which lug, when engaged by a stop or detent, will effect the disengagement of the clutch members.

Secured in the upper part of the machine frame is a longitudinal shaft 10, upon which is mounted for rocking movement a saw carrying frame or yoke comprising a tubular member 11 and bracket arms 12 and 13, in which latter is journalled a saw arbor 14 driven at a constant speed by pulley 15 and belt 8. Splined to the arbor 14 so as to rotate therewith, but slidable longitudinally of the arbor, is a collar 17 carrying a circular cutting saw 16, which is, therefore, mounted for transverse and parallel movements relative to the travel of the tubing through the machine, as in the machine of the patent aforesaid.

Secured to the shaft 20 is a cam 30, which cooperates with a roller 32 on the end of a lever 31, which latter controls the movement of the saw carrying frame or yoke toward and from the tubing, the projecting of the saw, toward the tubing being effected by means of the lift rod 37 actuated by compression spring 36, said rod being connected to lever arm 35, which is formed as an integral part of the hub by means of which lever 31 is mounted on shaft 10, the arm 35 having a jaw 34 adapted to engage a jaw 33 attached to the sleeve member 11 of the saw frame or yoke.

Secured to a transverse shaft 4 journaled in bearings on one of the side frames 2 is a rock arm 41 carrying roller 43 which engages cam 30. Also secured to the rock arm 41 is a rock arm 42, which, with the rock arm 41, constitutes a bell crank, the outer end of the arm 42 being connected by pull rod 44 through a pin 45 to a rocker arm 46, which latter is provided, at its lower end, with an integral sleeve 47 journaled on the pintle 48' carried by the cross girder 3. Also as an integral part of the sleeve 47 is an arm 48, which is connected by retractile spring 49 with one of the side frames 2, said spring normally tending to swing arm 48 into engagement with a stop lug 50 on the cross girder 3.

Pivotally connected to the lower end of the rock arm 46 by the same type of joint as shown and described in the Seymour patent aforesaid, is a lever 51 having a forked upper end 53 which straddles the saw carrying frame or yoke and is engaged with the annular groove in the hub 17 which carries the saw, the forked end of the lever 51 being connected to the hub by the usual pin and collar construction 54, which permits the saw to rotate while the lever 51 partakes of the movement of the saw longitudinally of the arbor during the cutting operation. The connection between the fork 53 of the lever 51 and the hub of the saw is provided with an upward extension 54', as indicated in Figs. 1 and 7.

The swinging arm 46 is provided at its upper end with an abutment which engages lever 51 to return the latter and the saw to its initial position. Also mounted on the upper end of the arm 46 is a stop lug 46' adapted to move under pivoted latch 55 secured to the under side of the sleeve 11 of the saw carrying frame or yoke to temporarily lock the arm 46, when it is moved out of engagement with lever 51, as described in the patent aforesaid.

Attached to the lever 51 is a strap 57, which is adapted to be taken up by spring drum 56 mounted on the cross girder 3, the spring drum serving through the strap connection to the lever 51 to move the latter during the cutting operation and thereby take the load of the saw and its associated parts off of the tubing during the cutting operation, as explained in the patent aforesaid.

The construction and operation of the machine as thus far described is substantially identical with the disclosure in the Seymour patent, except the particular arrangement of the clutch and the driving gearing interposed between shafts 6 and 20, which, in the present instance, are mounted on the outside or outer face of one of the side frames 2 and, therefore, more accessible for adjustment and repair.

Slidably mounted on the bar 5 and fixed in adjusted position thereon by a set screw, or similar device, is a frame 60 on which is mounted a vertical pin 62 upon which is pivoted a swinging frame 63, the lower edge of which is provided with bearing brackets 63' in which is mounted a shaft 64 to the outer end of which is secured a target or trip plate 65, the opposite end of the shaft having secured thereto a rock arm 66 which normally engages the pendant arm of pivoted dog 67, which is normally held in position to be engaged by rock arm 66 by a spring 68 which holds the dog 67 in engagement with a stop lug or pin 69 on the frame 60. This arrangement of swinging frame and trip plate is generally the same as that shown in the Seymour patent and the operation thereof is substantially identical with the latter.

Connected to the frame 63 is a swinging arm 70, which is connected by a swivel joint 71, with pull rod 72, the outer end of which is supported in a guide bracket 73 attached to the bar 5. The other end of the pull rod 72 is connected to a rock arm 76 formed integrally with a sleeve 75 journaled on a pin 74 fixed in a bracket 73', which is mounted upon bar 5. A second rock arm 76' is formed on sleeve 75, the lower end of rock arm 76' being connected by a link 78 to the rock arm 79 formed integrally with the sleeve 80 mounted on a stud extension of the bracket 73, said sleeve 80 carrying a finger or pawl 81, which cooperates with the upper hooked end 83 of a vertically disposed pull rod 82, the lower end of which is pinned to lugs 85 on a sleeve 84, journaled in bearing lugs on the side frame 2 adjacent the clutch, said sleeve 84 having thereon a stop lug 86 adapted to cooperate with the lug 29 on the clutch plate 28 and thereby disengage the clutch members.

Also formed as an integral part of the sleeve 75 is a rock arm 90, in the lower end of which is secured one member of an adjustable hinge connection 90' and to the other member of which is secured pull rod 91 connected to a horizontal lever 92 pivoted at 93 on the bar 5, the lever 92 having fixed thereon an upstanding stop lug or pin 94 adapted to cooperate with a swinging latch 95 pivoted on the extension 54' of the connection between the fork of rock lever 51 and the hub 17 of the saw, these parts being so arranged that the initial swinging movement of the arm 90 engages the lug or pin 94 with the latch 95 and thereby locks the saw to the swinging frame 62 through the connected instrumentalities, to wit, latch 95, lug 94, lever 92, link 91, rock arm 90, sleeve 75, rock arm 76, pull rod 72, arm 70 and frame 63. The purpose of this coordination is to provide a fixed and definite distance between the saw 16 and the target or trip plate 65 when the saw enters the tube in the initiation of the cutting operation, the engagement of the pin 94 with the latch 95 to lock the saw to the frame of the trip device being effected immediately after the clutch members 26 and 27 have been engaged to start the rotation of shaft 20 and cam 30, which permits the yoke or frame carrying the saw to be swung by its spring actuated means to project the saw into the path of travel of the tubing.

In order to hold the saw frame in its adjusted position during the cutting operation, there is provided a latch member 100 pivoted to a bracket 101 carried by the bar 5, said latch having a shoulder 102 on its forward end adapted to drop behind a square bar 103 mounted on the side of the bearing bracket 12 of the saw frame, so that, when the latter is swung to project the saw into cutting position, the shoulder of the latch drops behind the vertical face of the bar 103 and holds the frame in its adjusted position against the tension of the spring 58 connected to the bracket 101 by an adjustable eye bolt 59. In order to release the latch 100 and permit the saw frame or yoke to be returned to its initial position after the cutting operation, a novel form of trip plate is provided for lifting the latch out of engagement with the bar 103 as follows: Pivoted on a stud 108 on the inner face of the bracket 12 is a lever 107, the lower end of which is pinned to a rod 104, the outer end of which is guided in an eye 105 formed on the sleeve member 11 of the saw frame, said rod having thereon an adjustable stop 106, secured to the rod by set screw 106', which stop 106 is adapted to be engaged by one arm of the fork 53 of the rock arm 51, after the cutting operation has been completed, thereby sliding the rod 104 longitudinally of the sleeve member 11 of the saw frame and rocking lever 107, which latter is provided with a right angle extension 109 in the outer end of which is secured an adjustable screw stud 110, which engages the under side of the latch 100 and lifts the latter out of engagement with the bar 103, thereby permitting the spring 58 to swing the saw frame or yoke to withdraw the saw out of the path of movement of the tubing.

It is found necessary at times to suspend the cutting operation without stopping the machine in order to permit defective sections of tubing to be run through the machine without cutting the same and, to this end, the machine is provided with a lockout device comprising a finger 120 fast to a shaft 121 journaled in lugs on the end frame 2 and provided with an operating handle 122 by means of which the shaft is rotated and the lug 120 swung into and out of the path of movement of the saw frame. As shown in Fig. 1, the finger 120 is in its inoperative position where it is arrested by lug 123 engaging the side frame. When the finger 120 is swung in behind the bracket member 12 of the saw frame, the swinging movement of the latter under influence of spring actuated rod 37 is arrested and the saw is not projected into the path of movement of the tubing.

In order to accurately gauge the length of the sections to be cut from the tubing, the bar 5 is provided with a scale 116 with which registers a pointer 115 carried by the slide upon which the swinging frame 63 is mounted.

In order to accommodate tubes of different diameters, the machine is provided with an adjustable support for the tubing, as illustrated in Figs. 2 and 3, the same comprising a V-shaped or trough-like member 131 carried by a bracket 130, which latter is adjustable vertically and laterally with respect to the saw by means of bolts 134, which pass through vertical slots 132 in the bracket and horizonal slots 133 in the lateral extension of the side frame.

The operation of the machine as described is as follows: The tubing is fed into the machine, either from the mandrel of a tube making machine or by any other appropriate feeding device, and accurately guided through the machine by the supporting means 131, which has been properly adjusted to the particular size of the tubing. As the advance end of the tubing encounters the target or trip plate 65, it moves the trip plate and the vertically pivoted frame 63 as a unit and the swinging movement of the frame causes link 70 to move pull rod 72 in the direction of movement of the tubing. The initial movement of rod 72 swings the arm 76 and the sleeve 75 of which the same forms a part. The partial rotation of the sleeve 75 rocks lever 76', which, through link 78 and rock arm 79 on sleeve 80, causes the finger or pawl 81 to lift rod 82, thereby rocking stop lug 86 out of engagement with the lug 29 on the clutch plate 28, permitting the two members of the clutch to become engaged and start the rotation of shaft 20. The continued upward movement of the finger 81 frees the latter from the hooked end 83 of the lift rod 82 and the latter drops and rocks the stop 86 down to be in position to engage the stop lug 29 on the clutch plate after the shaft has made one complete revolution, and thereby disengages the clutch members. Immediately after the clutch members have been engaged and the shaft has started its rotation, the rocking motion of arm 90 moves the stop lug or pin 94 carried by the horizontal swinging lever 92 into locking engagement with the latch 95 carried by the extension 54' of the connection between the swinging lever 51 and the hub 17 of the saw, thereby locking the saw to the trip mechanism, including the swinging frame 63 and the trip plate 65 and accurately fixing the length of the section of the tube to be cut, as determined by the distance between the trip plate 65 and the saw, which distance will be fixed and determined for each adjustment of the trip mechanism, so that the lengths of all of the tube sections cut will be uniform. The initial rotation of the shaft 20 carries the high part of cam 30 out of engagement with the roller 32 on the lever 31, thereby permitting the spring actuated rod 37 to rock lever 35, and thereby rock the frame or yoke which carries the saw arbor 14 to swing the saw into the path of travel of the tubing. At the same time, the roller 43 engaging the cam, rocks arm 41 and connected lever 42 to swing rock lever 46 to the left, as shown in Fig. 1, against the tension of spring 49, which is connected to the companion lever 48, the stop lug 46' on the upper end of lever 46 snapping behind the pivoted detent 55 on the under side of the saw frame, so that said lever 46 is out of the path of movement of the lever 51, which has a swivel connection with the hub 17 of the saw. This permits the lever 51 to move with the saw, which latter has been engaged with the tubing, and this swinging movement of level 51 is effected, without imposing any strain on the tubing, by means of the spring motor 56 and the strap 57 in the manner and for the purposes explained in the Seymour patent aforesaid. The advance of the tubing, after the same has been engaged by the saw, swings the frame 63 and the trip plate 65 secure thereto until the arm 66 on the shaft 64 of the trip plate passes out of engagement with the pendent arm of the dog 67, thereby permitting the trip plate to rock on its axis until the lower edge of the plate engages the upper side of the travelling tubing. After the saw has completed the cutting operation, one arm of the forked end 53 of the swinging lever 51 engages the stop lug 106 on rod 104, moving said rod in the direction of travel of the saw, thereby swinging lever 108 so that the adjustable bolt 110 carried by said arm lifts the latch 100 out of engagement with the squared rod or lug 103 on the bracket 12 of the saw frame, thereby permitting the spring 58 to swing the saw frame to its rearward position and disengage the saw from the tubing. When the severed section of the tubing is discharged, the trip plate 65 swings back to its normal position, tilting the latch 67 and finally snapping under the latter into locked position. As the saw is swung into engaging relation with the tubing, the latch 95 carried by the saw slides out of engagement with the pin 94 and all of the parts are then ready to be returned to initial position upon completion of the cutting operation. The return rocking movement of the saw frame disengages latch 55 from the lug 46' on the swinging lever 46 and the latter is started in its return movement by spring 49 acting through lever 48, the upper end of rock lever 46 engaging lever 51, which slides the saw along its arbor to its initial position. The final portion of the rotation of shaft 20 causes the high part of the cam 30 to again engage the roller 32 on lever 31, thereby rocking lever 35 and forcing rod 37 downward against the tension of spring 36. As stated, when the shaft 20 has completed a single rotation, the lug 86 engages the stop lug 29 on the clutch plate 28, separating the clutch members and stopping the rotation of the shaft. In order to prevent any overthrow of the shaft, the latter is preferably provided with an automatic friction brake 39, which may be of any preferred form, but is preferably of the spring actuated clamping type shown in Fig. 4.

As in the Seymour patent aforesaid, the swinging frame 63 and the parts attached thereto are returned to their initial positions by means of the tension spring 63" attached to an extension of the frame at one end and to an adjustable anchorage on the slide 60, as shown in Fig. 5.

What we claim is:

1. A tube cutting machine comprising means for guiding a travelling tubing, a saw mounted for transverse and parallel movements relative to the travel of the tubing, means operative to project the saw into engagement with the tubing, a displaceable element engaged by the forward end of the tubing to initiate the operation of said projecting means, and releasable means for temporarily locking said element to the saw during the projecting movement of the latter.

2. A tube cutting machine comprising means for guiding a travelling tubing, a saw mounted for transverse and parallel movements relative to the travel of the tubing, means operative to project the saw into engagement with the tubing, a displaceable element engaged by the forward end of the tubing to initiate the operation of said projecting means, and means for locking said element to the saw during the projecting movement of the latter and to unlock said element at the completion of the projecting movement.

3. A tube cutting machine comprising means for guiding a travelling tubing, a saw having a movable support, a constantly driven shaft, mechanism operative to project the saw into engagement with the tubing said mechanism including a clutch connection with said shaft, a trip mechanism operated by the tubing to engage the clutch members to transmit motion from the shaft to the saw projecting mechanism, and means for temporarily locking the saw to the trip mechanism during the projecting movement of the saw.

4. A tube cutting machine comprising means for guiding a travelling tubing, a saw having a movable support, a constantly driven shaft, mechanism operative to project the saw into engagement with the tubing said mechanism including a clutch connection with said shaft, a trip mechanism operated by the tubing to engage the clutch members to transmit motion from the shaft to the saw projecting mechanism, a latch carried by the saw, and a detent actuated by the trip mechanism to engage the latch and lock the saw to the trip mechanism until the saw enters the tubing.

5. A tube cutting machine comprising means for guiding a travelling tubing, a saw having a movable support, mechanism operative to project the saw into engagement with the tubing, means controlling the operation of the saw projecting mechanism, a trip mechanism comprising a swinging frame mounted for movement about a vertical axis and connected with said controlling means, a plate attached to said frame and normally positioned to be engaged by the moving tubing to move the frame and thereby operate said controlling means to release the saw projecting mechanism, and means actuated by the trip mechanism for locking the saw thereto until the saw enters the tubing.

6. A tube cutting machine comprising means for guiding a travelling tubing, a saw having a movable support, mechanism operative to project the saw into engagement with the tubing, means controlling the operation of the saw projecting mechanism, a trip mechanism comprising a swinging frame mounted for movement about a vertical axis and connected with said controlling means, a plate attached to said frame and normally positioned to be engaged by the moving tubing to move the frame and thereby operate said controlling means to release the saw projecting mechanism, a latch carried by the saw and a detent actuated by the trip mechanism to engage the latch and lock the saw to the trip device until the saw enters the tubing.

7. A tube cutting machine comprising means for guiding a travelling tubing, a saw having a movable support, a lever operatively connected to the saw support, means normally tending to actuate said lever to project the saw into engagement with the tubing, a rotatable cam engaging said lever and normally holding the same against action of its actuating means, means for rotating the cam to release the lever by the action of its actuating means, a trip mechanism controlling said cam rotating means, and means actuated by the operative movement of the trip mechanism for locking the saw to said trip mechanism until the saw enters the tubing.

8. A tube cutting machine comprising means for guiding a travelling tubing, a saw having a movable support, a lever operatively connected to the saw support, means normally tending to actuate said lever to project the saw into engagement with the tubing, a rotatable cam engaging said lever and normally holding the same against action of its actuating means, means for rotating the cam to release the lever by the action of its actuating means, a trip mechanism controlling said cam rotating means, a latch carried by the saw, and a detent actuated by the trip mechanism to engage the latch and lock the saw to the trip mechanism until the saw enters the tubing.

9. A tube cutting machine comprising means for guiding a travelling tubing, a movable support having an arbor journaled therein and a sleeve carrying a saw slidable on said arbor, mechanism for moving the support to project the saw into engagement with the tubing, a displaceable element engaged by the forward end of the tubing to initiate the operation of said projecting means, and means for locking the said element to the saw during the projecting movement of the latter.

10. A tube cutting machine comprising means for guiding a travelling tubing, a movable support having an arbor journaled therein and a sleeve carrying a saw slidable on said arbor, mechanism for moving the support to project the saw into engagement with the tubing, a displaceable element engaged by the forward end of the tubing to initiate the operation of said projecting means, a latch carried by the saw, and a detent actuated by the displaceable element to engage the latch and lock the saw to the displaceable element until the saw enters the tubing.

11. A tube cutting machine comprising means for guiding a travelling tubing, a movable support having an arbor journaled therein and a sleeve carrying a saw slidable on said arbor, mechanism for moving the support to project the saw into engagement with the tubing, a trip mechanism comprising a swinging frame mounted for movement about a vertical axis and controlling the operation of the projecting mechanism, a plate attached to said frame and normally positioned to be engaged by the end of the moving tubing to move the frame and thereby initiate the operation of the projecting mechanism, and means actuated by the movement of said frame for locking the saw to the frame while the saw is being projected toward the tubing.

12. A tube cutting machine comprising means for guiding a travelling tubing, a movable support having an arbor journaled therein and a sleeve carrying a saw slidable on said arbor, mechanism for moving the support to project the saw into engagement with the tubing, a trip mechanism comprising a swinging frame mounted for movement about a vertical axis and controlling the operation of the projecting mechanism, a plate attached to said frame and normally positioned to be enaged by the end of the moving tubing to move the frame and thereby initiate the operation of the projecting mechanism, a swinging latch carried by the saw, and a detent connected to and actuated by the swinging frame to lock the saw to the frame while the saw is being projected toward the tubing.

13. A tube cutting machine comprising means for guiding a travelling tubing, a movable support having an arbor journaled therein and a sleeve carrying a saw slidable on said arbor, mechanism for moving the support to project the saw into engagement with the tubing, a trip mechanism comprising a swinging frame mounted for movement about a vertical axis and controlling the operation of the projecting mechanism, a plate attached to said frame and normally positioned to be engaged by the end of the moving tubing to move the frame and thereby initiate the operation of the projecting mechanism, a swinging latch carried by the saw, an arm pivoted to the machine frame, a detent on said arm cooperating with said latch, and connections between said arm and the swinging frame, whereby the operative movement of the latter effects the engagement of the latch with the detent to lock the saw to the frame while the saw is being projected toward the tubing.

14. A tube cutting machine comprising means for guiding a travelling tubing, a pivoted yoke having an arbor journaled therein and a sleeve carrying a saw slidable on said arbor, means normally operative to move the yoke away from engagement with the tubing, trip controlled mechanism operative to turn the yoke to project the saw into engagement with the tubing, a latch operative to hold the yoke with the saw in its projected position, a lever pivoted at one end to the machine frame and engaging at its other end the sleeve carrying the saw, a bell crank pivoted to the yoke having one arm cooperating with said latch, and a pull rod slidably mounted on said yoke and having an adjustable lug thereon to be engaged by the pivoted lever at the end of the cutting operation to swing the bell crank and free the latch from locking engagement with the yoke.

15. A tube cutting machine comprising means for guiding a travelling tubing, a pivoted yoke having an arbor journaled therein, a saw slidable on the arbor, spring actuated means for swinging the yoke to project the saw into engagement with the tubing, means comprising clutch and cam mechanisms controlled by the travel of the tubing to release the spring actuated mechanism, and a stop pivoted to the machine frame and adapted to be projected into the path of movement of the yoke to arrest the movement of the saw toward the tubing.

16. A tube cutting machine comprising means for guiding a travelling tubing, a pivoted yoke having an arbor journaled therein, a saw slidable on the arbor, spring actuated means for swinging the yoke to project the saw into enagement with the tubing, means comprising clutch and cam mechanisms controlled by the travel of the tubing to release the spring actuated mechanism, a shaft journaled on the machine frame adjacent one end of said yoke, and a stop lug fast to said shaft and adapted upon turning of the shaft to engage the yoke and arrest the saw projecting movement thereof.

In testimony whereof we affix our signatures.

HENRY DE SMITH.
DENNIS CHURCH.